US008341593B2

(12) United States Patent
Fildebrandt et al.

(10) Patent No.: US 8,341,593 B2
(45) Date of Patent: Dec. 25, 2012

(54) INTEGRATED DEVELOPMENT FRAMEWORK FOR COMPOSITE APPLICATIONS

(75) Inventors: Ulf Fildebrandt, Oftersheim (DE); Tobias Melcher, Dielheim (DE)

(73) Assignee: SAP AG, Walldorf (DE)

( * ) Notice: Subject to any disclaimer, the term of this patent is extended or adjusted under 35 U.S.C. 154(b) by 1096 days.

(21) Appl. No.: 12/257,226

(22) Filed: Oct. 23, 2008

(65) Prior Publication Data

US 2010/0107136 A1    Apr. 29, 2010

(51) Int. Cl.
G06F 9/44    (2006.01)
(52) U.S. Cl. ......................................... 717/105
(58) Field of Classification Search ............ 717/105
See application file for complete search history.

(56) References Cited

U.S. PATENT DOCUMENTS

| 8,069,437 | B2 * | 11/2011 | Aigner et al. ................. 717/106 |
| 2002/0054155 | A1 * | 5/2002 | Churchill et al. ............. 345/826 |
| 2003/0097369 | A1 * | 5/2003 | McKnight et al. ............ 717/105 |
| 2004/0003091 | A1 * | 1/2004 | Coulthard et al. ............ 709/227 |
| 2004/0015838 | A1 | 1/2004 | Watase et al. |
| 2004/0143822 | A1 * | 7/2004 | Jager et al. ................... 717/140 |
| 2005/0066304 | A1 * | 3/2005 | Tattrie et al. ................. 717/104 |
| 2006/0241961 | A1 * | 10/2006 | Tsyganskiy et al. ............ 705/1 |
| 2007/0033088 | A1 * | 2/2007 | Aigner et al. ................... 705/9 |
| 2007/0143680 | A1 * | 6/2007 | Cowan et al. ................. 715/713 |
| 2007/0283002 | A1 * | 12/2007 | Bornhoevd et al. ........... 709/224 |
| 2008/0092116 | A1 | 4/2008 | Kulkarni et al. |
| 2008/0161940 | A1 * | 7/2008 | Gerwens et al. ................. 700/4 |
| 2009/0313601 | A1 * | 12/2009 | Baird et al. ................... 717/106 |

OTHER PUBLICATIONS

"European Application Serial No. 09012414.0, Extended European Search Report mailed Dec. 18, 2009", 6 pgs.

* cited by examiner

*Primary Examiner* — Wei Zhen
*Assistant Examiner* — Junchun Wu
(74) *Attorney, Agent, or Firm* — Schwegman Lundberg Woessner P.A.

(57) ABSTRACT

There is disclosed an integrated development environment for development of a composite application, wherein the development environment integrates a plurality of different heterogeneous development frameworks to provide a single user interface and perspective for developing a composite application including components from the different heterogeneous frameworks. In the environment, objects from different frameworks and layers may be viewed simultaneously, navigated between, edited and composed. Error checking functionality allows edits across different layers or objects of different frameworks to be checked at design time.

20 Claims, 15 Drawing Sheets

INTEGRATED DEVELOPMENT FRAMEWORK FOR COMPOSITE APPLICATIONS

TECHNICAL FIELD

The invention relates generally to software development tools and more particularly to systems, methods, and articles of manufacture for development of composite applications.

BACKGROUND

In computing, the term "composite application" generally refers to an application built by combining multiple existing functions into a new application. Composite applications may leverage enterprise and enterprise-ready sources, for example existing modules or even enterprise web services of information. Composite applications can be built using any technology or architecture.

A composite application consists of functionality drawn from several different sources. The components may be individual selected functions from within other applications, or entire systems whose outputs have been packaged as business functions, modules, or web services. Composite applications often incorporate orchestration of "local" application logic to control how the composed functions interact with each other to produce the new, derived functionality.

SUMMARY

According to various example embodiments there is provided an integrated development environment and related capabilities for developing a composite application.

BRIEF DESCRIPTION OF THE DRAWINGS

FIGS. 2A, 2B, 2C, 2D, 2E, 2F, 2G, 2H, 2I, and 2J illustrate various example embodiments of a user interface for an integrated development environment, according to the inventive subject matter.

DETAILED DESCRIPTION

In the following detailed description of exemplary embodiments of the invention, reference is made to the accompanying drawings which form a part hereof, and in which is shown, by way of illustration, specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the scope of the present invention.

Figure 1A:
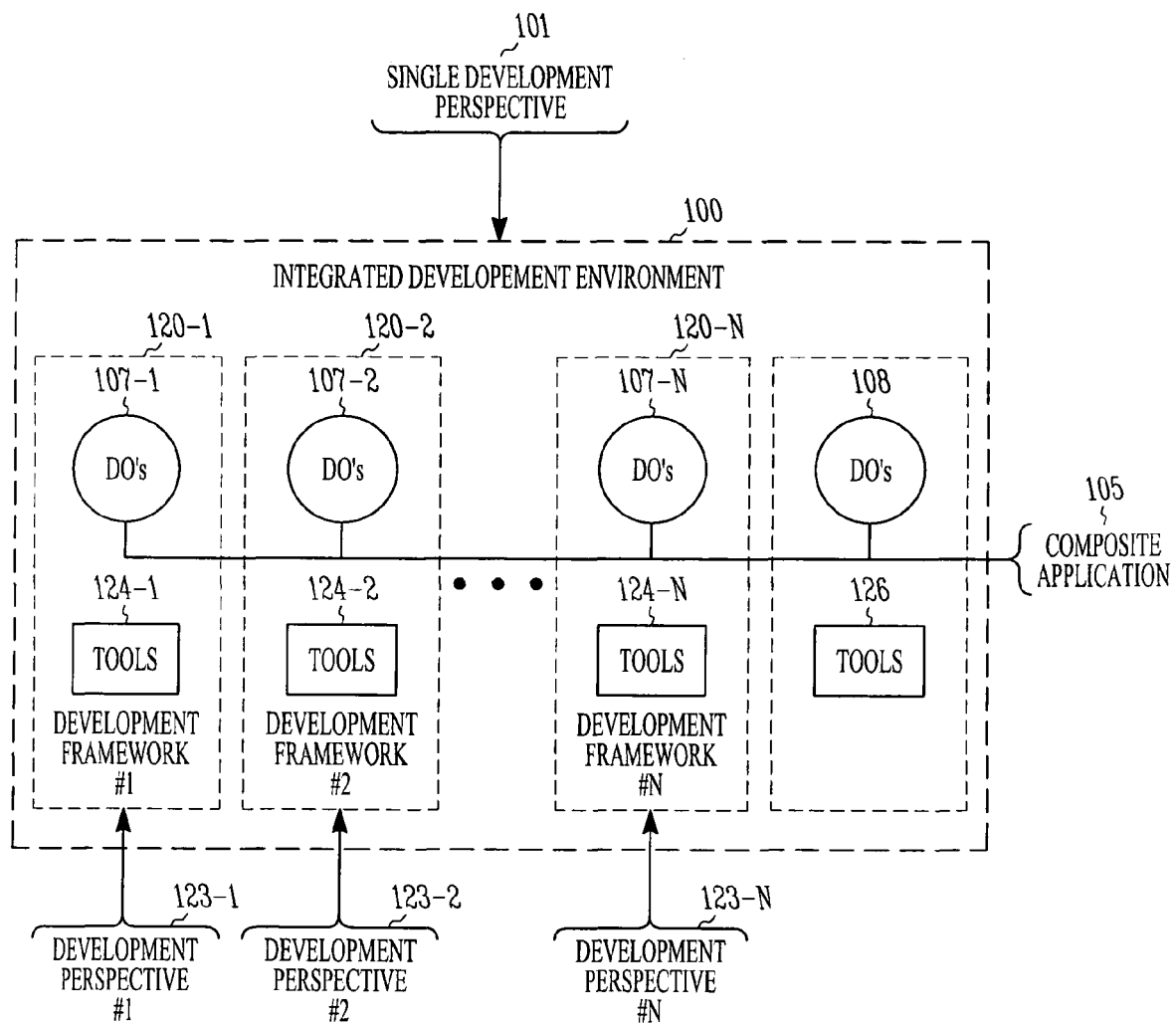
FIGS. 1A, 1B, 1C, 1D, 1E and 1F illustrate various aspects of an integrated development environment, according to various embodiments of the inventive subject matter.
Figure 1B:
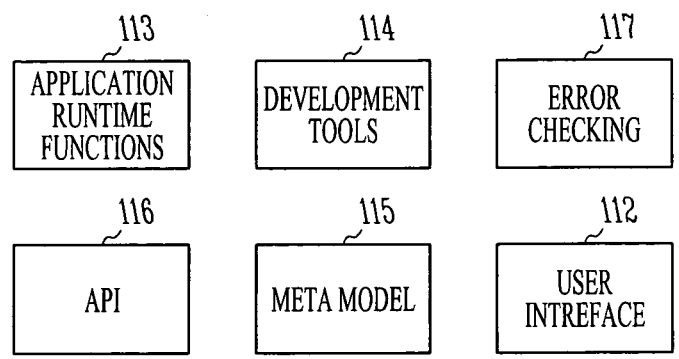

Referring now to FIG. 1A there is illustrated an overview of an integrated development environment 100 used to develop a composite application 105. Environment 100 is used to integrate the development objects (DOs) 107-1, 107-2 and 107-n and development tools 124-1, 124-2 and 124-n of respective heterogeneous development frameworks 120-1, 120-2 . . . 120-n, each having a respective development perspective 123-1, 123-2 and 123-n, into a single development environment providing a single development perspective 101. In an embodiment, objects 107 are non-native to environment 100. Their respective development frameworks 120 may exist outside of environment 100. According to one example embodiment, environment 100 further includes additional development objects 108 and development tools 126 that are native to environment 100. Non-native objects 107 and tools 124 may be less tightly integrated with environment 100 than object 108 and tools 126. In an example embodiment, the content of tools 124 may be imported into environment 100, but with read-only support (e.g., creation of development objects 107 is not supported). According to one example embodiment, environment 100 is a software development framework and includes support programs, code libraries, a scripting language, and other software to help develop and connect together the different components of a software project. As illustrated in FIG. 1B, environment 100 includes a graphical user interface 112, a plurality of development tools 114, a meta-model repository 115, an application programming interface (API) 116, and error checking functions 117 and application runtime functions 113 necessary to run a composite application 105.

Figure 1C:
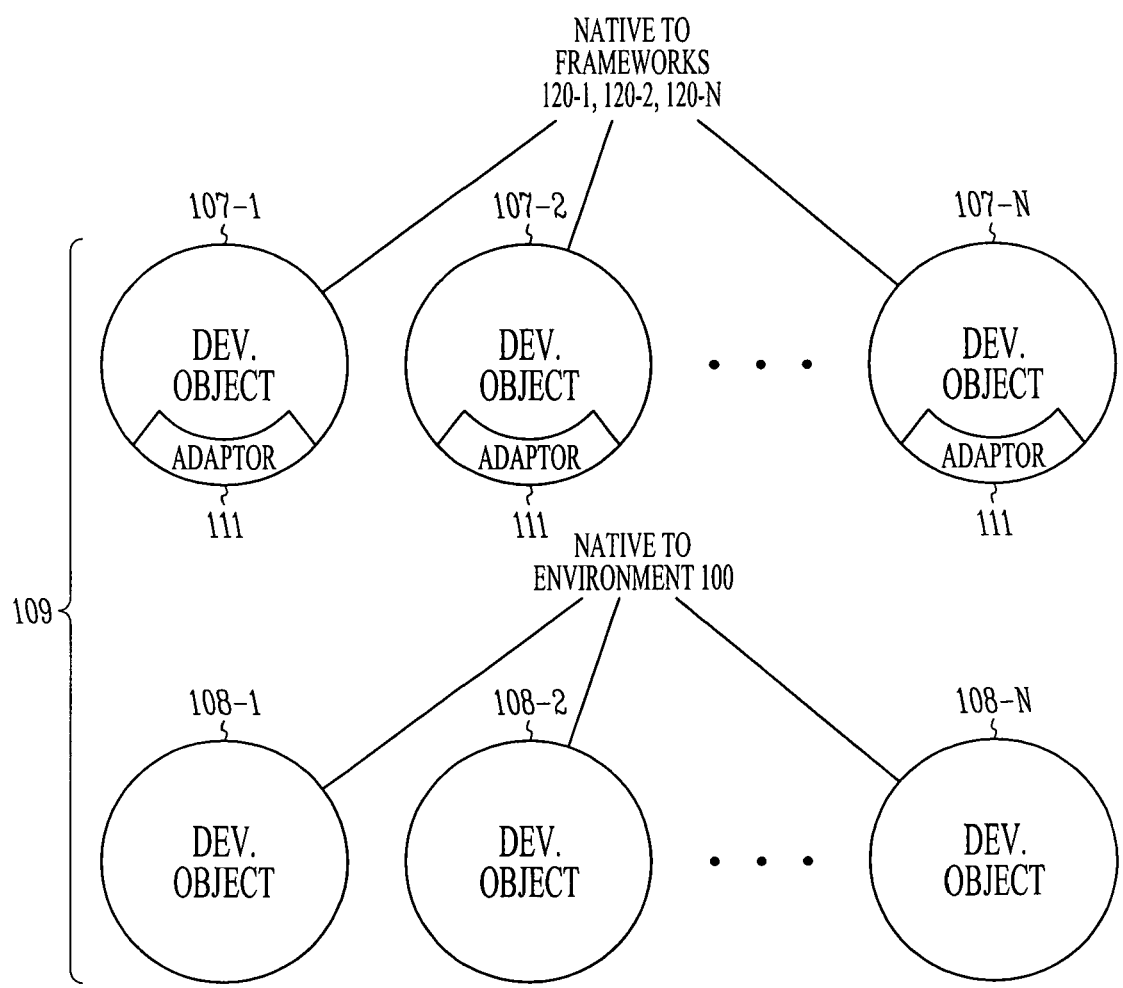

As described further below, composite application 105 includes functionality drawn from several different sources. According to one example embodiment, the components of composite application 105 may be individual selected functions from within other applications, or entire systems whose outputs have been packaged as business functions, modules, or web services. As illustrated in FIGS. 1A and 1C, composite application 105, in one example embodiment, may include one or more of the heterogeneous development objects 107-1, 107-2 . . . 107-n that are native to the one or more respective heterogeneous development frameworks 120-1, 120-2 . . . 120-n, and non-native to environment 100, and one or more development objects 108-1, 108-2 . . . 108-n that are native to the integrated development environment 100. Objects 107 and/or objects 108 may be collectively referred to herein as objects 109. Native development objects 108, and non-native development objects 107, interface with the environment 100 through the application programming interface (API) 116. In one embodiment, one or more objects 107 used in one of the respective frameworks 120 are not capable of use without modification in another one of the respective frameworks 120. Further, one or more objects 108 native to environment 100 are not capable of use in native form with one or more of the frameworks 120. According to one embodiment, objects 107 include adaptors 111 enabling the non-native objects 107 to interface with API 116.

Figure 1D:
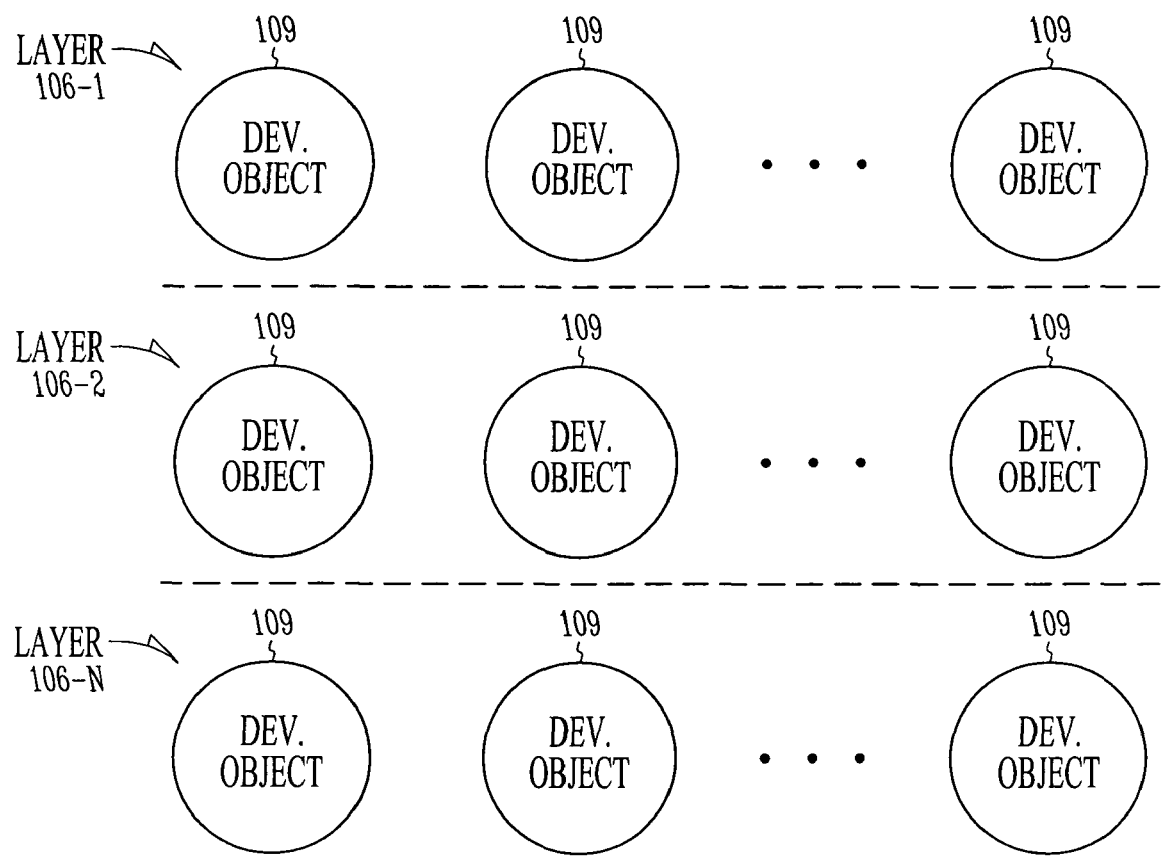

As illustrated in FIG. 1D, composite application 105 further includes, in one example embodiment, one or more layers 106-1, 106-2 . . . 106-n. In object-oriented design, a layer is a group of classes that have the same set of link-time module dependencies to other modules. In other words, a layer may be formed of a group of reusable components that are reusable in similar circumstances. These layers can include, but are not limited to, a web-program development layer, a service layer, a user interface technologies layer, a process layer, and/or any other layers. A composite application 105 may include only one layer 106, such as a process-layer, or many layers. While specific examples of layers are enumerated above, the invention is in no way limited to any particular layers or combination of layers.

Figure 1E:
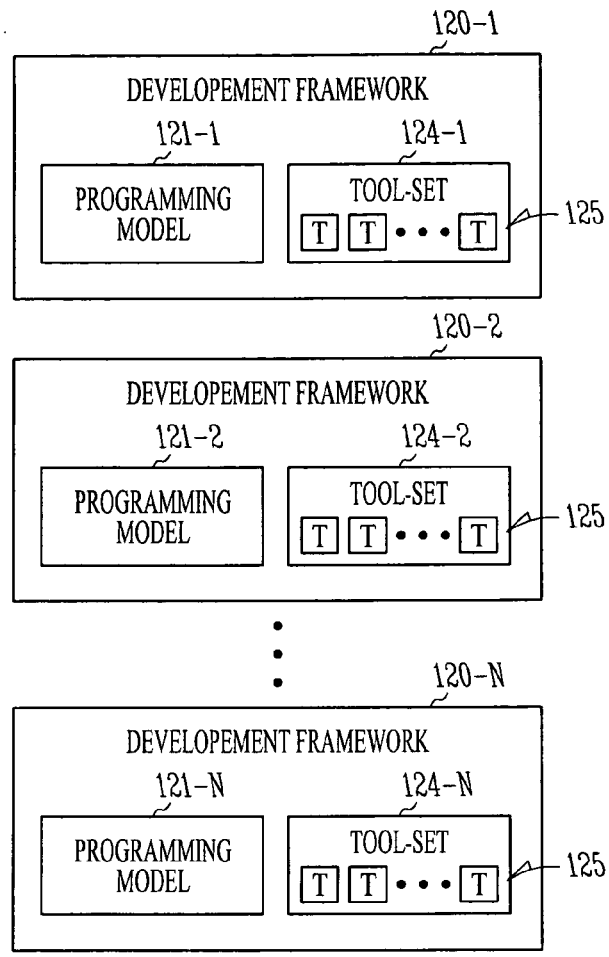

According to one example embodiment illustrated in FIG. 1E, the heterogeneous development frameworks 120-1, 120-2 . . . 120-n are each designed for developing programs using corresponding programming models 121-1, 121-2 . . .

120-*n*. According to one embodiment, a programming model is an abstract conceptual view of the structure and operation of a computing system. Such environments and models may be, for example, for development of web portals, guided procedures, visual composition of user interfaces, or web-based applications. Development frameworks 120-1, 120-2 . . . 120-*n* each include respective development tool sets 124-1, 124-2 . . . 124-*n*, native to these environments. Tool sets 124 each include a plurality of tools 125 that are used to develop programs within these environments, and in particular compose or edit objects 107 used in such programs. Tools 125 are, in one example embodiment, programs or applications that software developers use to create, debug, maintain, or otherwise support other programs and applications.

Figure 1F:
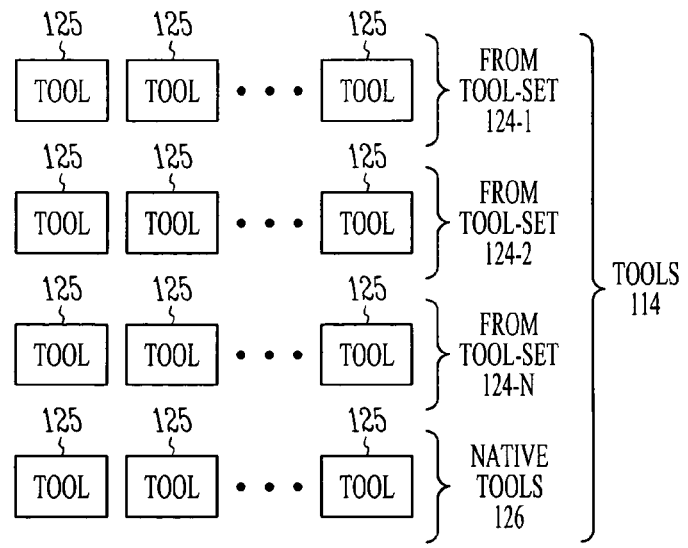

According to one example embodiment illustrated in FIG. 1F, development tools 114 accessible in environment 100 include one or more of the tool sets 124 native to the developmental frameworks 120, such that a developer may access these tools if composing or editing an object 107 within environment 100. Thus, the integrated development environment 100 enables a developer to implement a composite application 105 using heterogeneous objects 107 from heterogeneous development frameworks 120 and using heterogeneous tool sets 124, all from a single user interface 112. Accordingly, environment 100 subsumes all editors and views that are specific for any of the development frameworks 120, providing at least the basic functionality for editing a composite application 105. Development in environment 100 is further supported with model- and code-generation-based methods via tools that store models 121 in a meta-model repository 115.

Referring now to FIGS. 2A through 2I, one example embodiment of a user interface 112 and associated functionality is described. According to one example embodiment 200 illustrated in FIG. 2A, the integrated development environment 100 provides a user interface 112 that is used to browse, edit, and compose composite applications 105, and in particular development objects 109 and the relationships and dependencies between those objects. Objects 109 are displayed in a tree view in a composite explorer 210, illustrated in more detail in FIG. 2B, in graphical views in the composite designer 212, illustrated in more detail in FIG. 2C, and in a detail view window 214. An outline view window 216 is used to display an outline view of the composite application 105. A palette 218 of development tools, menus, and options to support development are also provided.

Figure 2A:
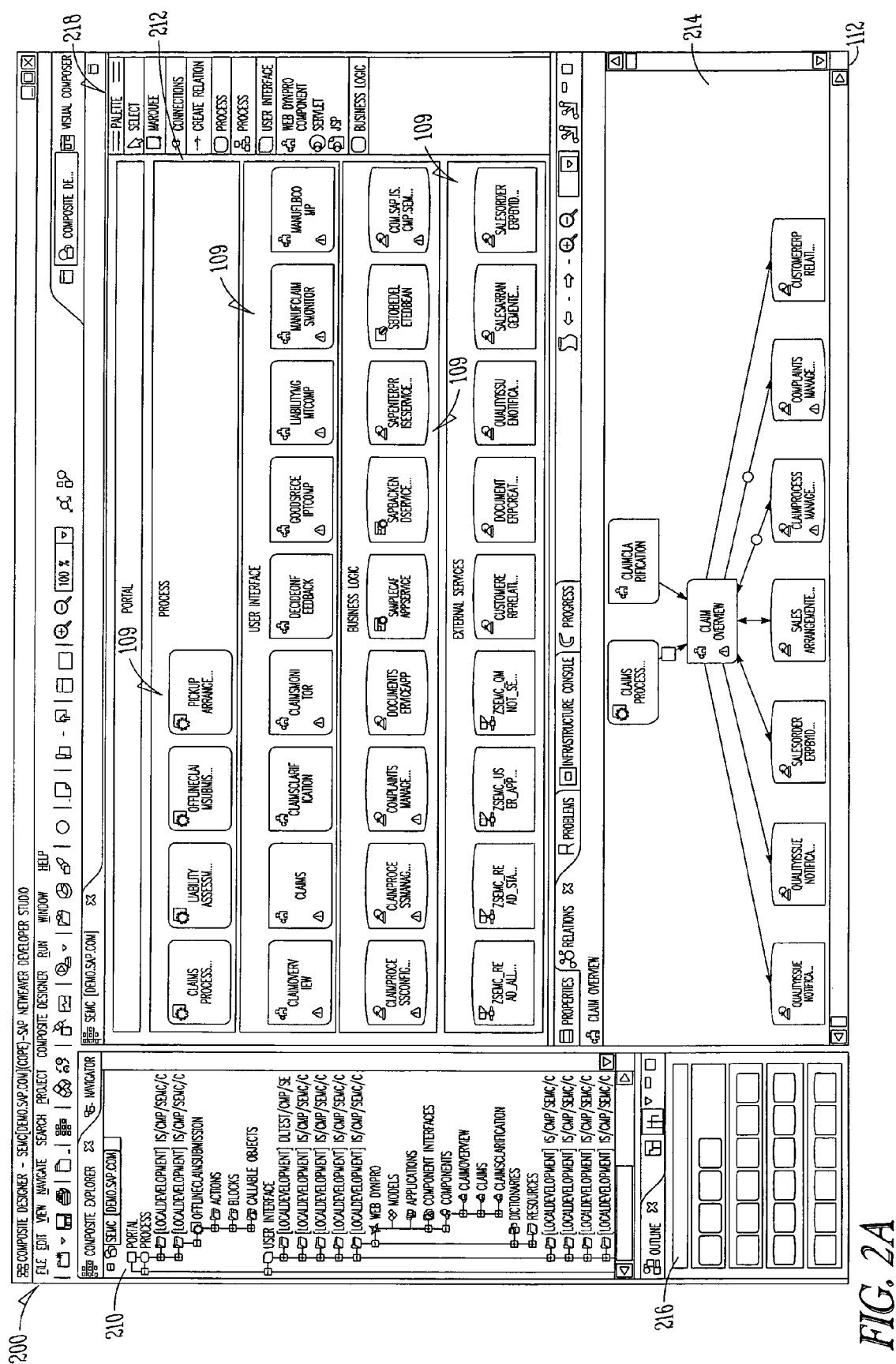
Figure 2B:
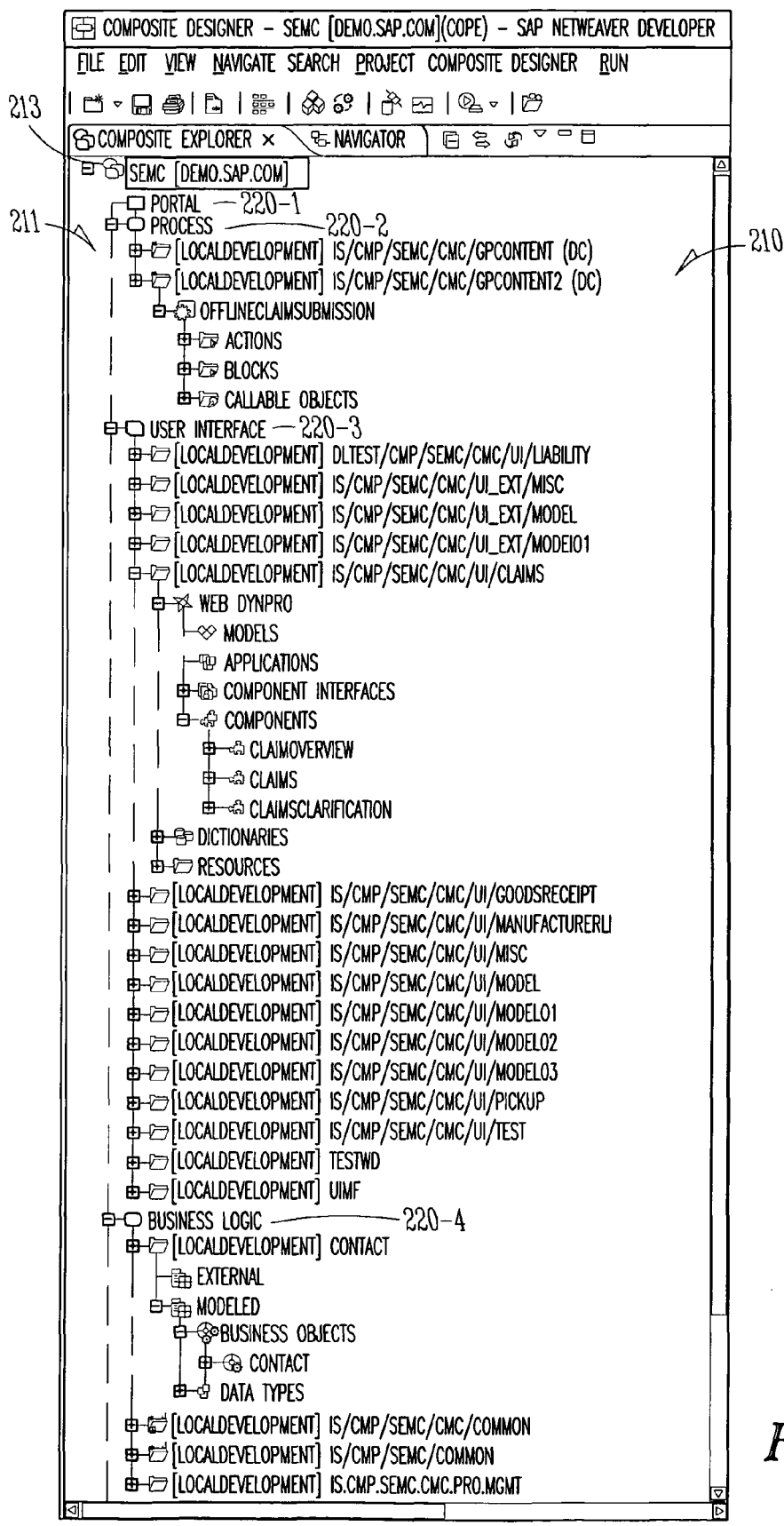

FIG. 2B illustrates an example view of the composite explorer 210 in more detail. In this example embodiment, composite explorer 210 integrates all relevant content provided from the different frameworks 120 into one view 211. "Product" or "software component" entities may be used as a root entity 213 in the tree. In one example embodiment, the objects 109 contained in the given product or software component are structured in five layers, a portal layer 220-1, a processes layer 220-2, a user-interface (UI) layer 220-3, a business logic layer 220-4, and an infrastructure or external services layer 220-5 (not shown in FIG. 2B). Composite explorer 210 makes all the tasks needed for composite application development accessible from one explorer view 211. As such, there is no need to switch the perspective in development environment 100 in order to develop a composite application 105 using objects 109 in different layers or from different programming models or frameworks.

Figure 2C:
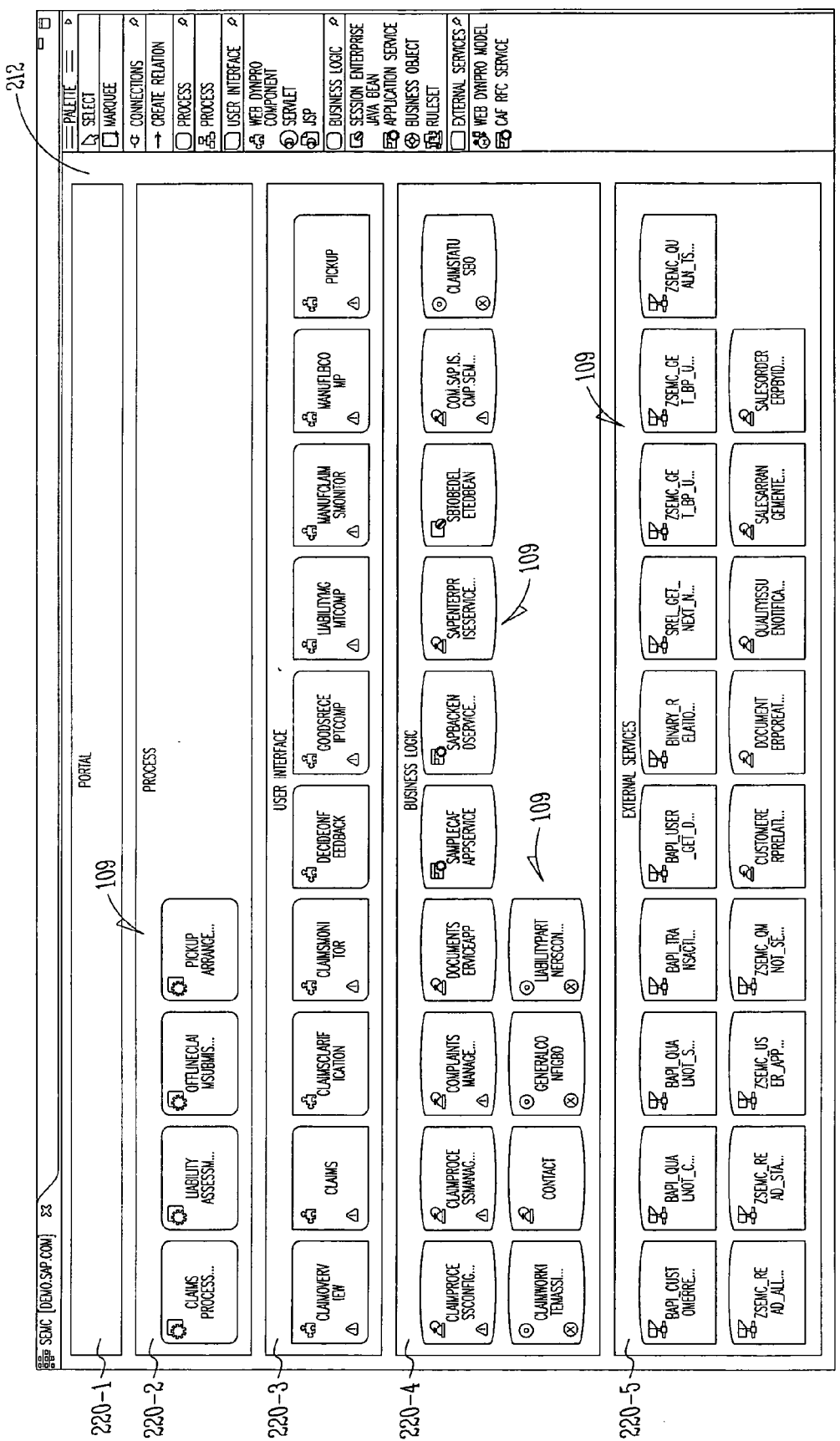

FIG. 2C illustrates the composite designer 212, which shows an overview of all the main (re-usable) development objects 109 of a composite application in a graphical view. In one embodiment, the development objects 109 are structured in layers 106, for example but not by way of limitation, a portal layer 220-1, a process layer 220-2, UI layer 220-3, a business logic layer 220-4, and an external services layer 220-5. According to one example embodiment, the composite designer 212 gives a quick overview of the content of a composite application 105, and may be the entry point for composite application development. According to one example embodiment, actions like Show Relations 231, Navigate to Tool Editor 232, Trigger Check Framework 233 and others, can be triggered from the overview using pop-up or drop-down navigation menus 230 as for example shown in FIGS. 2D and 2E.

Figure 2D:
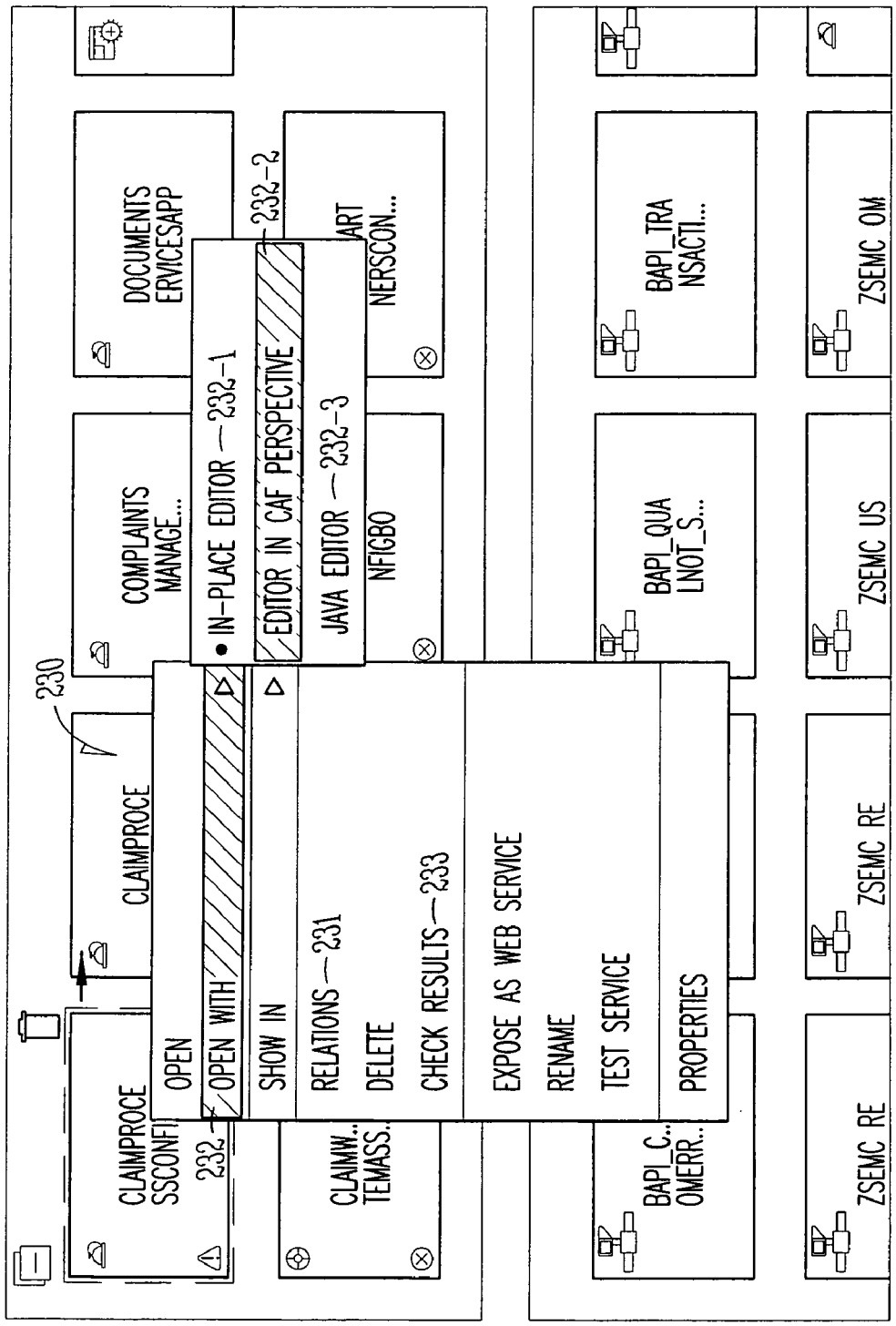

FIG. 2D is an example interface illustrating menus 230 used to navigate from the composite designer 212 to a tool specific editor to edit a development object 234. These editors may be native to the development environment 100, or non-native, for example supported on an external server. In one embodiment there are three navigation/editing options. The first tool editor 232 option 232-1 is to open the editor inside a composite designer perspective. The second option 232-2 is to open the editor in a tool specific perspective. Lastly, there is an option 232-3 to open a tool specific graphical modeler.

Figure 2E:
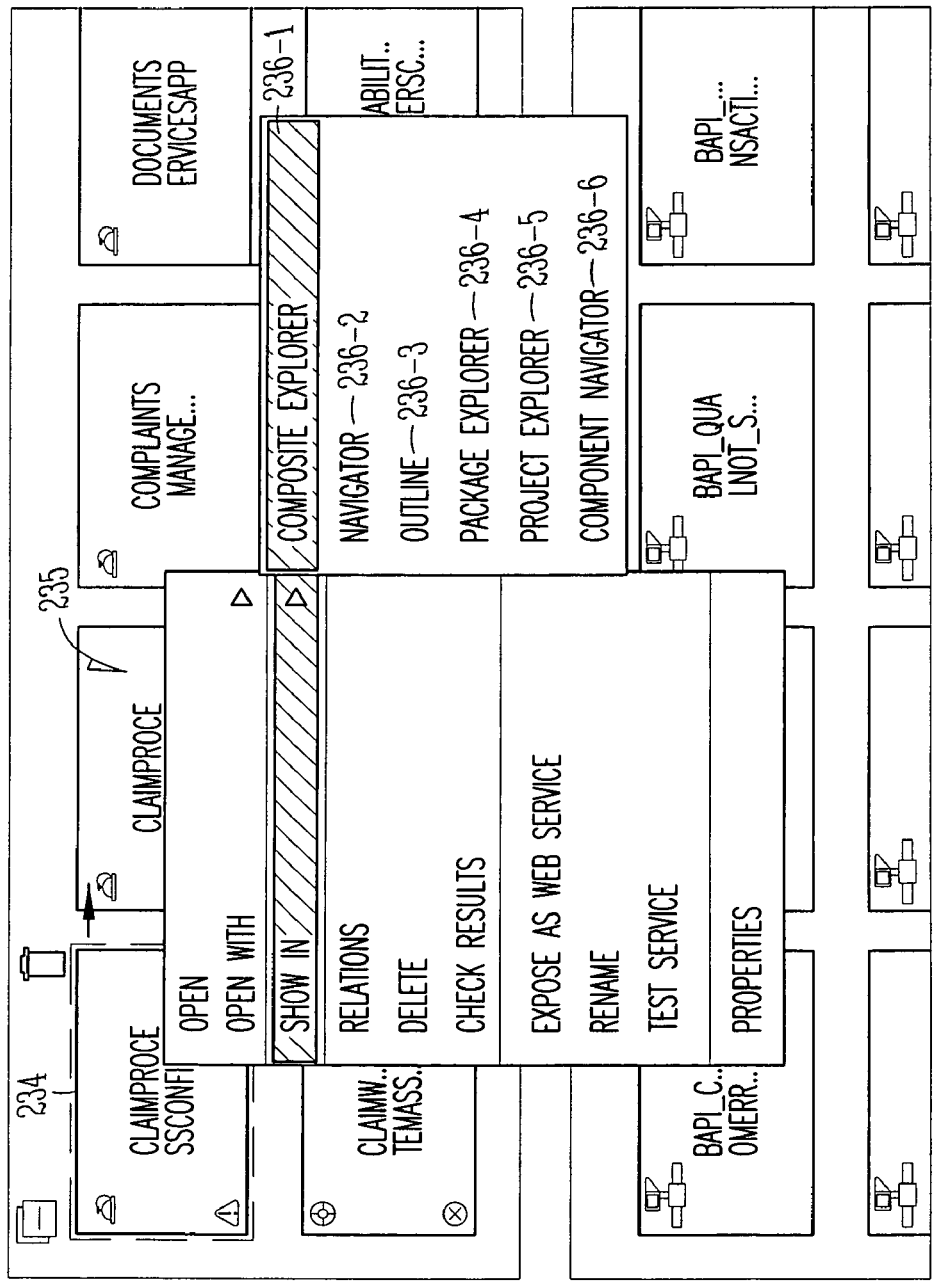

FIG. 2E illustrates an example interface allowing a user to navigate from the composite designer 212 to the composite explorer 210. For example, the user may select an element in the composite designer 212 and use the menu option 235 to display the corresponding object 234 in the explorer view 211. In one embodiment these views can include, but not by way of limitation, Composite Explorer 236-1, Navigator 236-2, Outline 236-3, Package Explorer 236-4, Project Explorer 236-5, and Component Navigator 236-6.

Figure 2F:
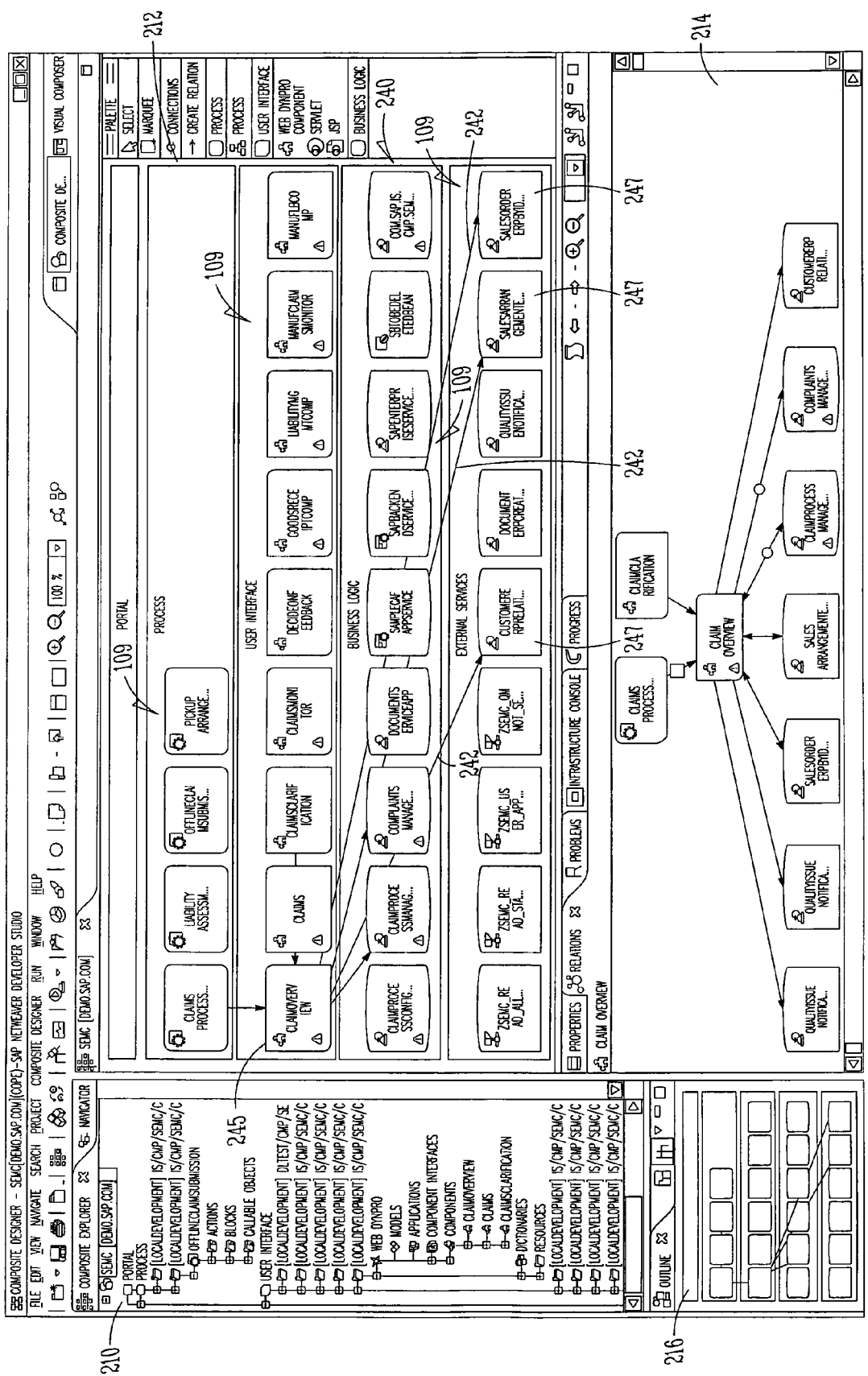

FIG. 2F illustrates an example view 240, selected from the menu options, that displays relations 242 between the main development objects 109 of different toolsets 124 of a composite application 105. The relations 242 can be shown in a separate view, referred to as a "relations view," or in the composite designer 212 for example as activated by a menu button. In one embodiment, the relations view supports graphical and textual, for example form-based, visualization of the relations, for example a relation from a first web-based component 245 to various objects 247 of the integrated development environment 100. In one embodiment, two modes of relationship exposure are possible: a basic mode that shows only relations between main objects 109 with no details of internal structure shown and an extended mode that shows detailed relations including internal structure between development objects 109.

Figure 2G:
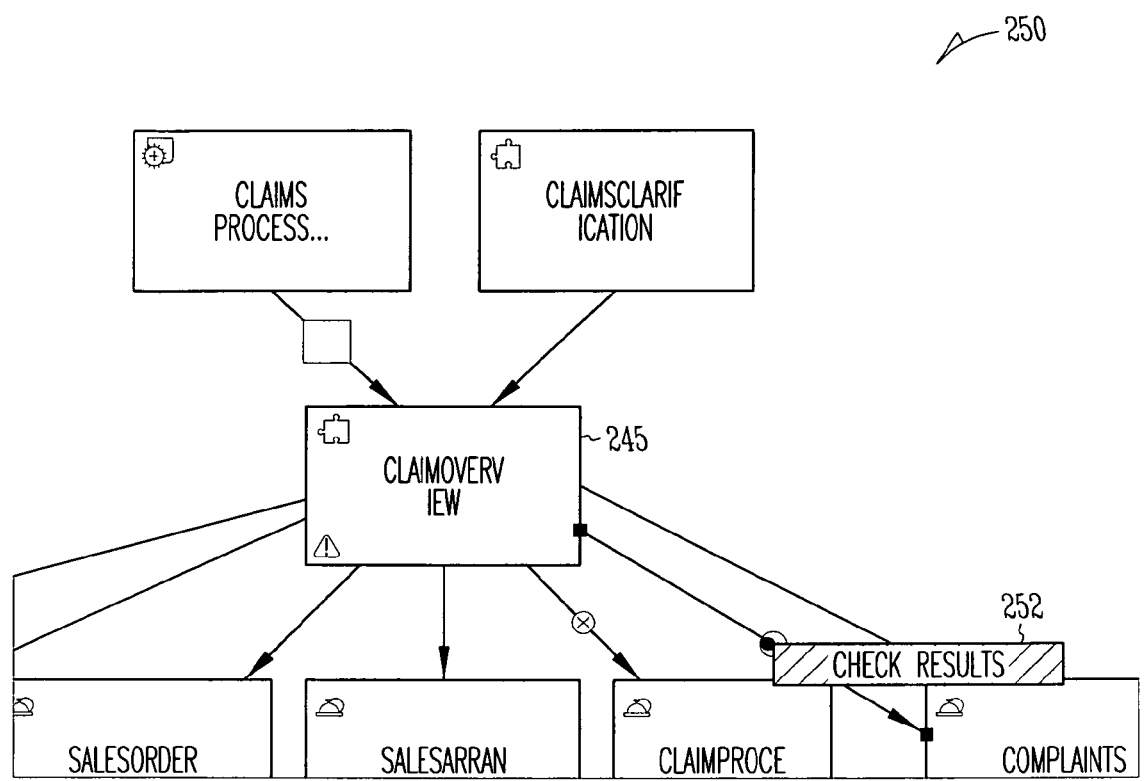

FIG. 2G illustrates an example interface 250 to check consistency between different toolsets. In one embodiment, the consistency check is done on the operational level between the different toolsets, for example for the web component 245 that is consuming an application service operation. The consistency check notifies a developer at design time in case of incompatible changes of an operation. Mapping of Input/Output parameters from usage (e.g. a web model class) to used object (e.g., an application service operation) are shown in a check result dialog 252.

Figure 2H:
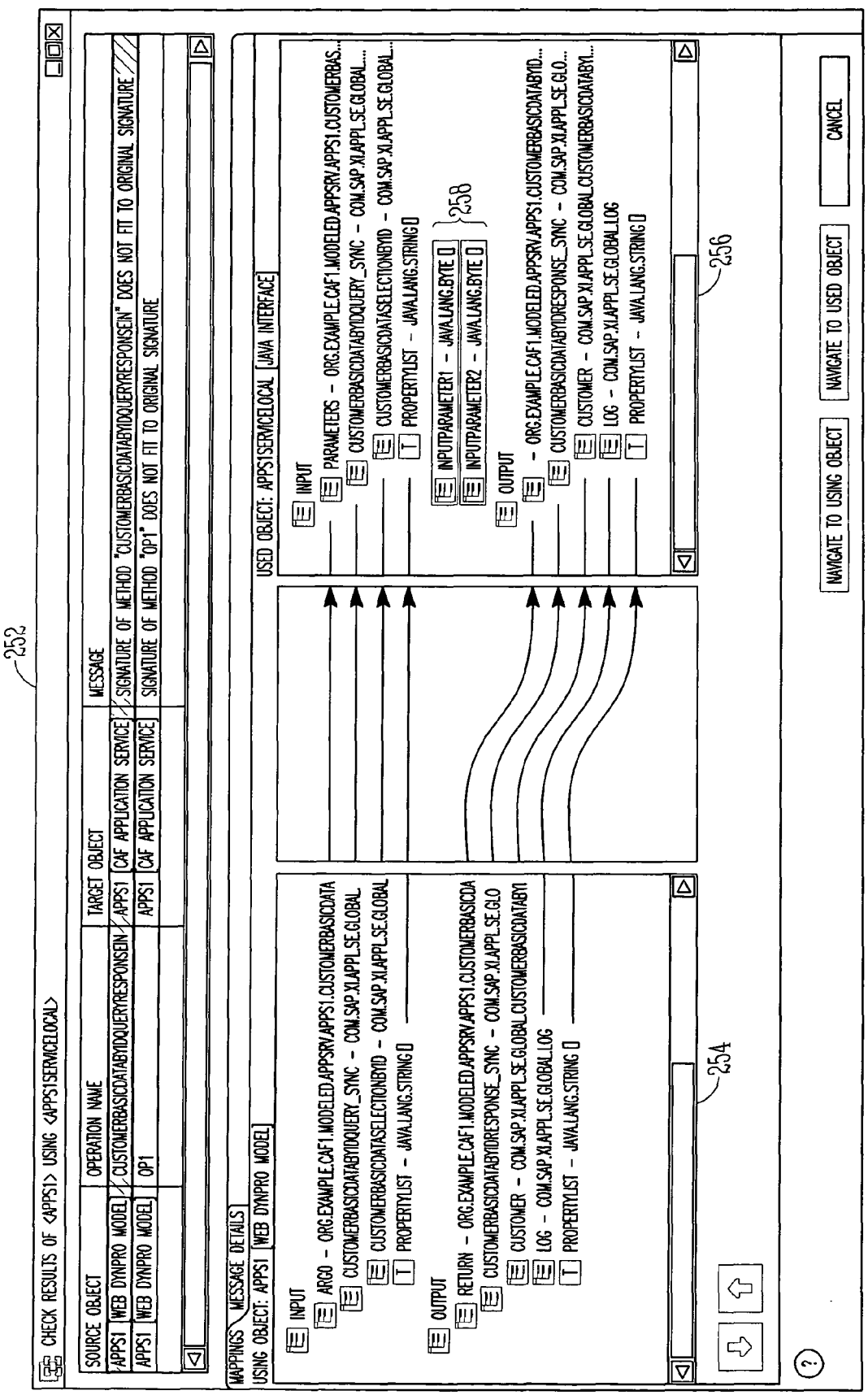
Figure 21:
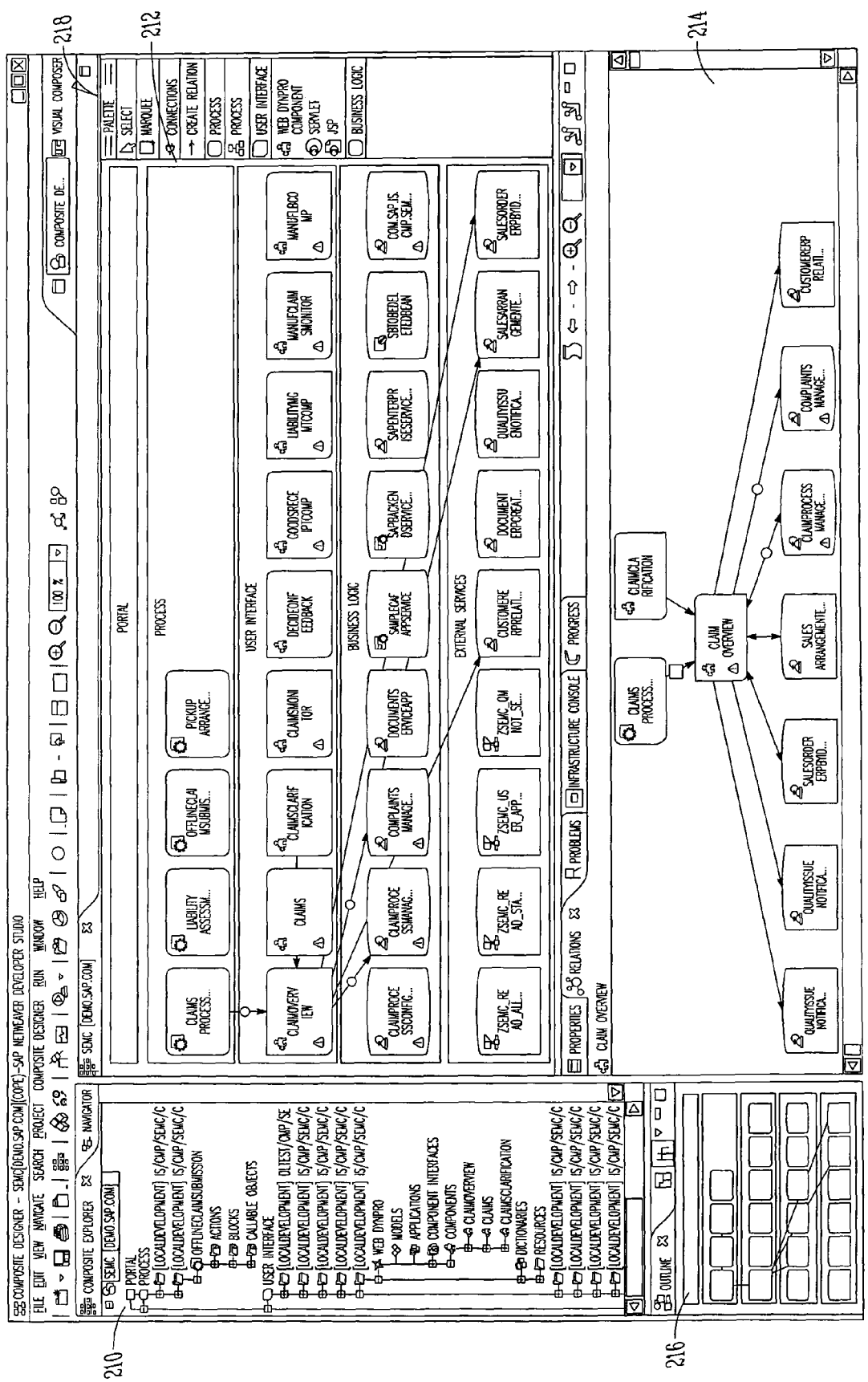

FIG. 2H illustrates an example check result dialog 252. It shows parameter/attribute mappings between a source 254 and a target 256 operation. In an example embodiment, an operation has an input/output structure. The dialog 252 may show the inconsistencies 258 between the structures of the source 254 and target 256 operations.

FIG. 2I illustrates an example interface allowing a user to create new development objects 109 in the graphical overview using palette 218, with no need to switch perspective.

This can provide one common UI behavior to create new entities across all frameworks 120 and associated toolsets 124.

Figure 2J:
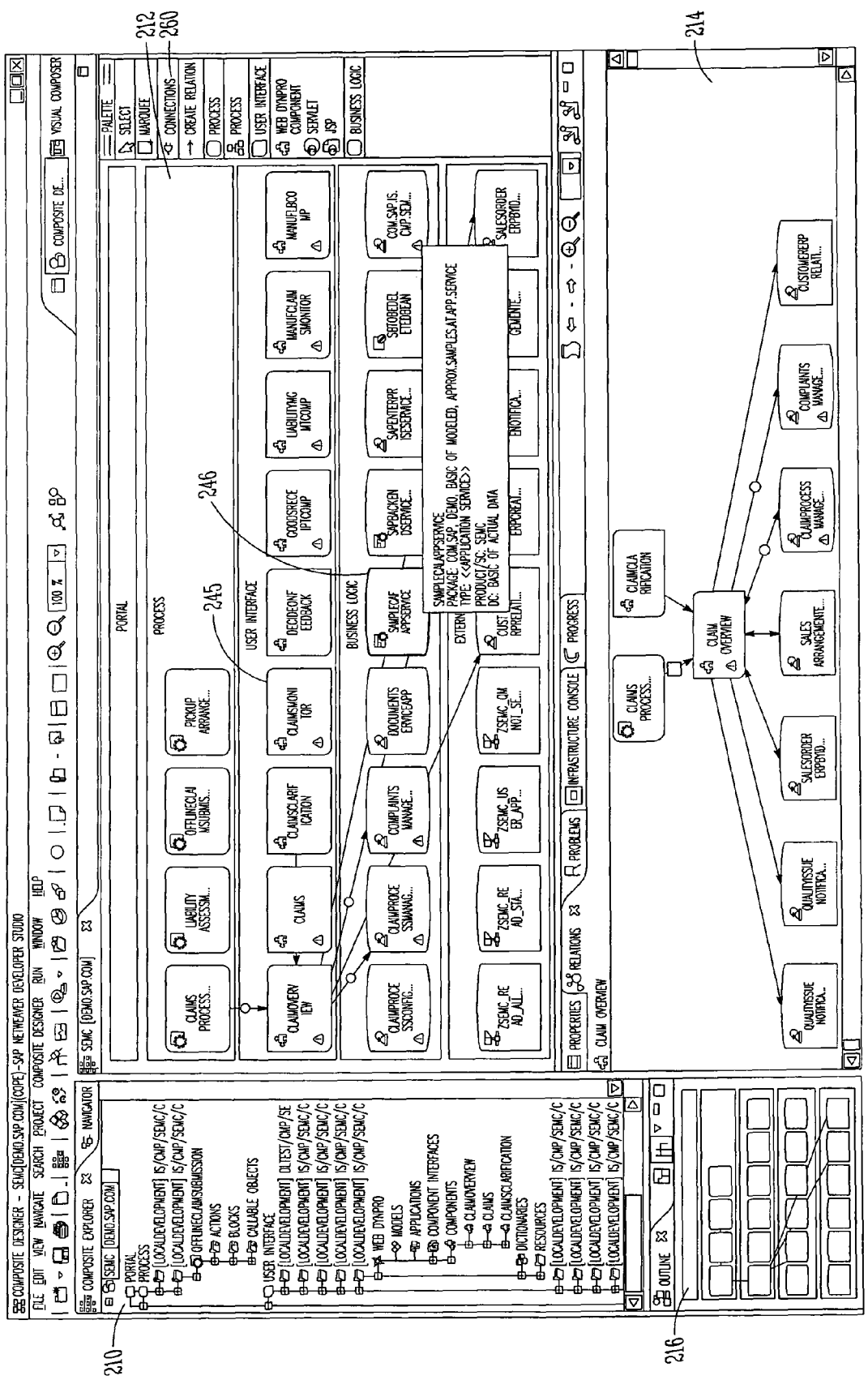

FIG. 2J illustrates an example interface to create relations on-the-fly between developments objects 109 of different toolsets 124 via the Connection Palette Tool 260 in the graphical overview. For example, the tool 260 can create a relation from the web component 245 to the application service 246. In one example embodiment, this improves developer productivity by automatically setting all preconditions, for example object 109 dependency, access permissions, and others so that relation creation is possible. As such, in this embodiment, manual steps in creating relations are no longer necessary.

Accordingly, environment 100 allows non-native objects 107 from a plurality of different development frameworks to be edited from the same user interface 112. According to one example embodiment, the tools 300 include a plurality of tool sets 124 that are native to respective development frameworks 120. Each development framework 120 may also include a context menu entry to navigate to objects 109 of other programming models.

Figure 3:
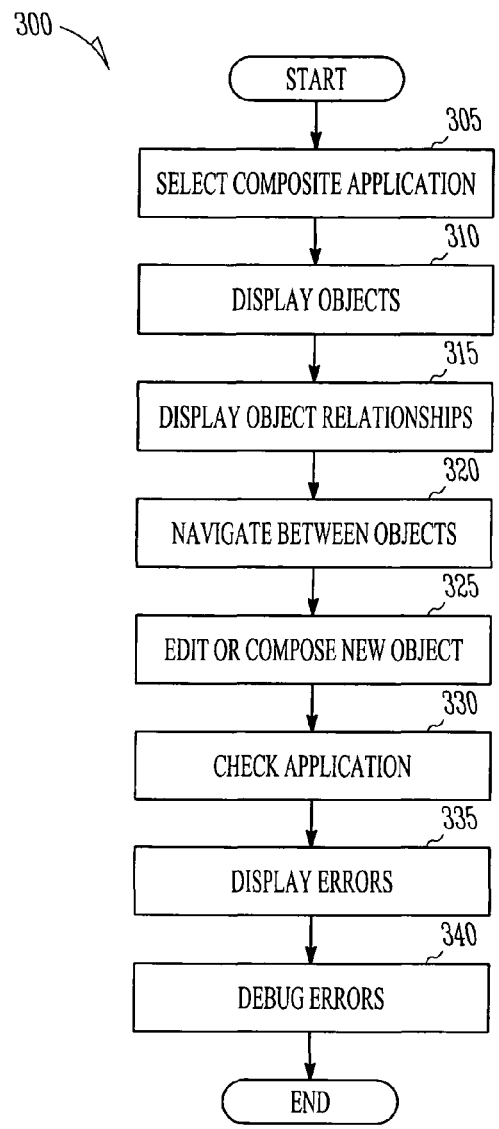
FIG. 3 illustrates a flow chart of a method, according to one example embodiment of the inventive subject matter.

Referring now to FIG. 3, there is shown a flow diagram 300 illustrating one example embodiment of one example mode of use of the development environment 100. While a specific order of operations is given, it shall be understood that the order of operations may be varied or used in any combination. A composite application 105 is selected and loaded 305 into the environment 100. Objects of the composite application 105, at least two of which are native to respective different development environments, are displayed 310 together in a tree view and/or in a graphical view showing the layer to which each object belongs. Relationships between the objects shown in the graphical view are graphically indicated 315, for example across all objects or for a selected object. A user can select an object in any layer and navigate 320 to a target object in the same or different layer. The target object's function may be edited 325, for example by editing the code of the object, by altering the object's relationships, or by other means. Or, a new object may be created. The user may navigate back to the source object. In addition, the user may check 330 the composite application 105 and any errors in the composite application are displayed 335 to the developer at design time. The developer may then debug 340 any problems with the composite application 105 prior to run time.

According to one example embodiment, environment 100 may use breadcrumbs wherein every object of a programming model that was a navigation target is also one node in the breadcrumb so that by clicking on a node a backward navigation is possible. A view provided by environment 100 may contain the breadcrumb with a collection and history of all objects 109 and the development framework 120 of the programming model to handle the objects. According to one example embodiment, each framework/tool provides a context menu entry to navigate to entities of other programming models. Accordingly, for example, a developer can start from an entity in a process and navigate to a user interface. Next, in the perspective of the user interface programming model the developers can navigate to a used service. Then, within the implementation of the service the developer can change the coding. Finally, after the change in the code a developer navigates back to the user interface or the process and is able to test the change.

According to another example embodiment, the integrated development environment 100 may integrate non-native development frameworks 120 either directly or indirectly. For example, some of the tool sets 124 may be built into environment 100, and others may be downloaded from an external source, such as a server holding server-based tools 124. According to another example embodiment, a composition application 105 matches to a software component, and the content of the different frameworks 120 in a composite application 105 are stored in specific development objects 109.

Figure 4:
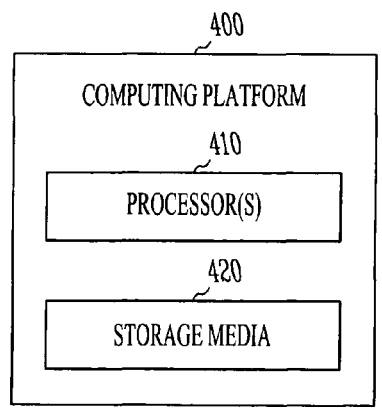
FIG. 4 illustrates a computing platform, according to one example embodiment of the inventive subject matter.

Referring now to FIG. 4 there is illustrated a computing platform 400 that may host the development environment 100. According to one example embodiment, development environment 100 may be stored on one or more machine readable media 420 on platform 400, such as a hard drive or memory circuits, and execute on one or more processors 410. Platform 400 may take the form of one or more servers or other computing systems, such as workstations, personal computers, or mainframes.

Thus, other embodiments may be realized. For example, an article of manufacture, such as a computer, a memory system, a magnetic or optical disk, some other storage device, and/or any type of electronic device or system may include one or more processors coupled to a machine-readable medium such as a memory (e.g., removable storage media, as well as any memory including an electrical, optical, or electromagnetic conductor) having instructions stored thereon (e.g., computer program instructions), which when executed by the one or more processors result in performing any of the actions described with respect to the methods above.

The machine may take the form of a computer system having a processor coupled to a number of components directly, and/or using a bus. Such components may include main memory, static or non-volatile memory, and mass storage. Other components coupled to the processor may include an output device, such as a video display, an input device, such as a keyboard, a cursor control device, such as a mouse, and a signal generation device, such as a speaker. A network interface device to couple the processor and other components to a network may also be coupled to the bus. The instructions may further be transmitted or received over the network via the network interface device utilizing any one of a number of well-known transfer protocols (e.g., HTTP). Any of these elements coupled to the bus may be absent, present singly, or present in plural numbers, depending on the specific example to be realized.

The processor, the memories and the mass storage device may each include instructions which, when executed, cause the machine to perform any one or more of the methods described herein. In some examples, the machine operates as a standalone device or may be connected (e.g., networked) to other machines. In a networked environment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, the term "machine" shall also be taken to include any collection of machines that individually or jointly execute a set (or multiple sets) of instructions to perform any one or more of the methodologies discussed herein.

The term "machine-readable medium" should be taken to include a single medium or multiple media (e.g., a centralized or distributed database, and/or associated caches and servers, and or a variety of storage media, such as the processor, registers, memories, and the mass storage device) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include tangible media, such as solid-state memories and optical and magnetic media.

Accordingly, described above is an integrated development environment 100 that provides, among other things, for development of composite applications from a single perspective. The environment 100 provides for display, editing, and creation of objects in different layers of the application and from different heterogeneous development environments using heterogeneous development tools. Environment 100 enables a developer to view relationships between objects in different layers, and to navigate from an object in one layer to an object in another layer, and to check any edits to the application in design time. Environment 100 therefore allows a developer to more readily develop or debug composite applications.

What is claimed is:

1. A system comprising:
   a memory to store data associated with the system; and
   one or more processors coupled to the memory, the one or more processors configured to implement an integrated development framework to develop a composite application using at least a plurality of non-native development objects, wherein the non-native development objects are native to respective programming models using respective non-native development tools, wherein the composite application further includes a plurality of layers and the objects belong to one or more of the layers;
   the integrated development framework including an application programming interface (API) used by the non-native development objects to communicate with the integrated development framework;
   the integrated development framework including a graphical user interface providing a visual development framework to:
   (a) simultaneously display at least two of the non-native development objects from at least two of the different programming models;
   (b) display an indication of the layers of the composite application and so that the at least two objects are displayed to indicate to which of the layers they belong;
   (c) display one or more relationships between the displayed development objects;
   (d) edit one or more of the displayed development objects or a relationship defined between the objects;
   (e) enable a user to navigate between objects displayed in different layers;
   (f) enable a user to edit one or more relationships between objects in different layers; and
   the integrated development framework further including at least one error-checking function to check edited objects and the edited relationships between the objects and to indicate to a user any errors identified by the check.

2. A system according to claim 1 wherein the integrated development environment includes a development tool function to access and use a non-native development tool to edit a non-native software object inside the visual development framework.

3. A system according to claim 1 wherein the user interface includes at least one navigation function to navigate between the at least two non-native development objects, wherein the navigation includes selecting one of the non-native objects and in response thereto at least identifying to a user at least one other non-native object that is related to the selected non-native object.

4. A system according to claim 1 wherein the error-checking function applies at least one rule to determine if an edit to a programming object or an object relationship results in an execution error at runtime of the composite application.

5. A system according to claim 1 wherein at least one of the non-native development tools includes an adaptor to enable it to communicate with the application programming interface of the integrated development framework.

6. A system according to claim 1 wherein the non-native development objects are displayed so that they are visually associated with a graphical representation of the software layers.

7. A system according to claim 1 wherein the user interface includes at least one user-selectable relationship display option to cause the system to display the relationships between the at least two non-native development objects, wherein the relationships include dependencies between the at least two non-native development objects.

8. A system according to claim 1 further including one or more functions to allow a user working in the visual development framework to:
   navigate from a source software object in one of the layers to a target software object in another of the layers;
   change the coding of the target software object; and
   following changing the code navigate back to the source software object and test the change using the at least one error checking function.

9. A system according to claim 1 further including an import function to import content for the development tools from other respective development frameworks for the development tools.

10. A system according to claim 1 further including a packaging infrastructure to assemble the composite application.

11. A system according to claim 1 further including at least one software object or development tool native to the integrated development framework.

12. A system according to claim 1 wherein the system includes a project browser that displays the objects in a tree representation.

13. A system according to claim 1 wherein at least one of the layers is selected from the group: process, user interface, business logic or services.

14. A system according to claim 1 wherein the non-native development tools are native to respective programming models and at least one of the models is selected from the group: a programming model to develop a web portal, a programming model to develop a guided procedure, a programming model using visual composing, and a programming model to develop web-based applications.

15. A system according to claim 1 wherein at least one object is selected from the group: process objects, user interface objects, business object objects, and services objects.

16. A system according to claim 1 wherein at least one of the programming models for the non-native development tools are server-based, and the content for the respective tools are downloaded to the integrated development framework from the respective server.

17. A non-transitory machine-readable storage medium comprising instructions that, when executed by one or more processors of a machine, cause the machine to implement an integrated development framework to develop a composite application using at least a plurality of non-native development objects, wherein the non-native development objects are native to respective programming models using respective non-native development tools, wherein the composite application further includes a plurality of layers and the objects belong to one or more of the layers;

the integrated development framework including an application programming interface (API) used by the non-native development objects to communicate with the integrated development framework;

the integrated development framework including a graphical user interface providing a visual development framework to:

(a) simultaneously display at least two of the non-native development objects from at least two of the different programming models;

(b) display an indication of the layers of the composite application and so that the at least two objects are displayed to indicate to which of the layers they belong;

(c) display one or more relationships between the displayed development objects;

(d) edit one or more of the displayed development objects or a relationship defined between the objects;

(e) enable a user to navigate between objects displayed in different layers;

(f) enable a user to edit one or more relationships between objects in different layers; and the integrated development framework further including at least one error-checking function to check edited objects and the edited relationships between the objects and to indicate to a user any errors identified by the check.

18. A non-transitory machine-readable storage medium according to claim 1 wherein the integrated development environment includes a development tool function to access and use a non-native development tool to edit a non-native software object inside the visual development framework.

19. A non-transitory machine-readable storage medium according to claim 1 wherein the user interface includes at least one navigation function to navigate between the at least two non-native development objects, wherein the navigation includes selecting one of the non-native objects and in response thereto at least identifying to a user at least one other non-native object that is related to the selected non-native object.

20. A non-transitory machine-readable storage medium according to claim 1 wherein the non-native development objects are displayed so that they are visually associated with a graphical representation of the software layers.

\* \* \* \* \*